United States Patent [19]

Takahashi

[11] Patent Number: 5,479,538

[45] Date of Patent: Dec. 26, 1995

[54] ERROR DIFFUSING METHOD IN IMAGE REPRODUCING PROCESS AND IMAGE PROCESSING APPARATUS USING SUCH A METHOD

[75] Inventor: Yasuhiko Takahashi, Tokyo, Japan

[73] Assignee: Nippon Steel Corporation, Tokyo, Japan

[21] Appl. No.: 983,091

[22] Filed: Nov. 24, 1992

[30] Foreign Application Priority Data

Nov. 26, 1991 [JP] Japan .................................. 3-336117

[51] Int. Cl.⁶ .................................................. G06K 9/38
[52] U.S. Cl. ........................... 382/270; 358/456; 358/466
[58] Field of Search ..................... 382/50, 270; 358/466, 358/465, 455, 456

[56] References Cited

U.S. PATENT DOCUMENTS

| | | | |
|---|---|---|---|
| 5,050,223 | 9/1991 | Sumi | 382/50 |
| 5,077,812 | 12/1991 | Kanno et al. | 382/50 |
| 5,150,429 | 9/1992 | Miller et al. | 382/50 |
| 5,307,425 | 4/1994 | Otsuka | 382/50 |
| 5,317,653 | 5/1994 | Eschbach et al. | 382/50 |

OTHER PUBLICATIONS

J. C. Stoffel "A Survey of Electronic Techniques for Pictorial Image Reproduction" IEEE. Transactions on communications, vol. COM-29, No. 12, Dec. 1981.

*Primary Examiner*—Leo H. Boudreau
*Assistant Examiner*—Chris Kelley
*Attorney, Agent, or Firm*—Pollock, Vande Sande & Priddy

[57] ABSTRACT

An error diffusing method and apparatus are used for an image processing in which a tone of each of the pixels of the image is approximated by either a maximum or minimum tone determined from the tone value of that pixel. The pixels are processed sequentially in a predetermined order and either a first code indicative of the maximum tone or a second code indicative of the minimum tone, depending on a magnitude of the tone of the pixel, is allotted to each of the pixels. An error obtained as a difference between the tone value of that pixel and the code allotted thereto is a negative error when the first code is allotted thereto and a positive error when the second code is allotted. When the error is positive it is diffused to the selected adjacent pixels to correct their tone values by predetermined proportions of the error, and when the error is negative, the tone value of each of the selected adjacent pixels is maintained without correction or replaced by a predetermined proportion of the error based on the relationship between the absolute value of the predetermined proportion of the error and the absolute value of the tone value of the pixel, wherein allotting of one of the codes to each pixel is based on the tone value of the pixel corrected by the error diffused from the selected adjacent pixels.

10 Claims, 6 Drawing Sheets

| | n=1 | 2 | 3 | |
|---|---|---|---|---|
| | (200) | (0)<br>0<br>0<br>−22 | (0)<br>0<br>0<br>−4.4 | |
| | (−55) | (−22.0) | (−4.4) | |
| | (200)<br>−22 | (0)<br>−4.4<br>−11.0<br>−30.8 | (0)<br>−1.3<br>−4.4<br>−20.2 | |
| | (−77) | (−50.6) | (−26.4) | |
| | (200)<br>−30.8 | (0)<br>−20.2<br>−15.4<br>−34.3 | (0)<br>−10.6<br>−10.2<br>14.0 | |
| | (−85.8) | (−69.9) | (−34.8) | |
| | (200)<br>−39.9 | (0)<br>−28.0<br>17.2<br>−38.0 | (0)<br>−13.9<br>−13.9<br>−33.3 | |
| | (−94.9) | (−83.2) | (−61.1) | |
| | | | | |

ERROR DIFFUSING METHOD IN IMAGE REPRODUCING PROCESS AND IMAGE PROCESSING APPARATUS USING SUCH A METHOD

BACKGROUND OF THE INVENTION

1. Field of the Invention

The invention relates to an error diffusing method in an image reproducing process and an image processing apparatus using such a method. More particularly, it relates to error diffusing in an image reproducing process with continuous-tone image data and an image processing apparatus using such a method.

2. Description of the Related Art

An error distributing algorithm of a conventional error diffusing method will be first described. For instance, as disclosed in J. C. Stoffel, "A Survey of Electronic Techniques for Pictorial Image Reproduction", IEEE Transactions on Communications, Vol. COM-29, No. 12, December, 1981, according to the error diffusing method, for example, in case of a pixel arrangement as shown in FIG. 6, the pixels are sequentially processed in an order of the pixels A→B→C→D→E→F→. In the process of each pixel, when the tone of the pixel is binary-coded, a threshold value S which is set to a value between the displayable maximum grade M and minimum grade L is compared with tone data DATA of each pixel. When the tone data DATA is not smaller than the threshold value S, a dot is generated. When the tone data DATA is smaller than the threshold value S, no dot is generated.

By executing the above processes, when the dot is generated, the pixel presents the maximum grade M. When no dot is generated, on the contrary, the pixel presents the minimum grade L. Therefore, when the tone data DATA is in a range of L<DATA<S, the pixel which actually has an intermediate tone is printed at the minimum grade L (ordinarily, zero grade: therefore, the pixel is printed in the background color of a recording paper).

In this case, a tone of pixel as printed has an error of (DATA-L) as compared with the actual pixel tone. Such an error is distributed to the adjacent pixels which will be processed later than the processed pixel so that the image is displayed as a whole at a tone grade near the actual image. In the case where the tone of pixel as printed is lower than the actual pixel tone, it is assumed that the error is a positive error, and hence the above error (DATA-L) is the positive error. The positive error of a pixel, for example, pixel D is distributed to adjacent pixels E, G, and H. In the case where one of the adjacent pixels, for instance, the pixel E has tone data of DATA', the distributed error is added to the tone data DATA'. There is a possibility that the errors are distributed to the pixel E from not only the pixel D but also the other adjacent pixels A and B. When the tone data corrected by the accumulation value of all of the distributed errors is larger than the threshold value S, a dot is generated when the pixel E is printed. Similar processes are also executed with respect to the other pixels.

On the other hand, when the tone data DATA of the pixel D is in a range of S<DATA<M, a dot is generated when H is printed. Therefore, the pixel D is printed at a tone which is higher than the actual tone by (M-DATA). Since (M-DATA) is a negative error, when the error is distributed to the adjacent pixels, the distributed negative error is subtracted from the actual tone data of each of the adjacent pixels. As mentioned above, each pixel is printed based on the sum of the actual tone data of the pixel itself and the positive or negative errors distributed from the adjacent pixels. The errors are thus cancelled with each other and hence the total error is minimized when the whole image is viewed.

The threshold value S of the error diffusing method is generally set to a value near 50% (128 in case of displaying an image with 256 grades) in order to improve the accuracy in position of dots corresponding to the pixels having tones of intermediate to higher grades. Therefore, the negative error occurs as mentioned above. However, the characteristic of the positive error is different from that of the negative error, that is, they are not symmetrical. Therefore, when the positive and negative error are processed in the same manner, the displayed picture presents visually and actually undesired appearance although an average tone of the original picture is maintained. This is because the tone which is desired to be reproduced is not an average tone of the whole image, but a tone of a narrow area including the pixel of interest.

For instance, in case of printing two long vertical lines a and b as shown in FIG. 5A, the negative errors occurring due to the generation of the left line a are progressively accumulated in the direction of the progressing pixels, namely, in the right downward direction. Due to the accumulated errors, the diffused negative errors are added to the tone data of the pixel at a position where the right line b should be generated so that the corrected tone value of the pixel may become smaller than the threshold value S. In such a case, as shown in FIG. 5B, no dot is generated at the position where the dot should be generated and the line is broken.

On the other hand, for example, a case of generating vertical lines at the columns n=1 and n=4, as shown in FIG. 6 will now be considered. It is now assumed that the tone of each vertical line is 200, the maximum grade M is 255 and the minimum grade L is 0. As for the error diffusion amount due to the generation of the line at the column n=1 including the pixels A, D, G, and J, the negative errors increase progressively in the right downward direction as shown in FIG. 7. That is, in FIG. 7, a numerical value in [ ] of the first line of each pixel indicates a tone of that pixel. The value of the second line indicates an amount of error which is distributed to that pixel from the upper pixel. The value of the third line indicates an amount of error which is distributed from the left-upper pixel. The value of the fourth line indicates an amount of error which is distributed from the left side pixel. The value in ( ) of the lowest line indicates a total value of the errors. In the example, for simplicity of explanation, it is assumed that the error is distributed to each of the right and lower pixels by 40% and to the right-lower pixel by 20%.

As will be obviously understood from FIG. 7, since the negative errors produced by the generation of the line a at the column n=1 are progressively accumulated in the right direction and in the right-lower direction, the accumulated negative error increases according to the pixel position which approaches the right lower position. Therefore, with respect to the line b at the column n=4, the negative errors distributed from the pixels of the line a to each of the pixels of the line b are larger than the tone value of each pixel of the line b and the total negative errors of lower pixels of the line b become larger than the total negative errors of upper pixels of the line b, so that the possibility of generation of the dot becomes smaller for the lower pixels than for the upper pixels of the line b. Moreover, since the negative error cannot be cancelled by generation of a dot unlike the positive error, the negative error becomes progressively larger, when dots are vertically generated along a line, in the right-down direction from the line. Thus, no dot is generated and a line is broken at a position where a dot should be generated as mentioned-above.

SUMMARY OF THE INVENTION

An object of the present invention is to provide an error diffusing method, which is used for an image reproducing process in which an image is reproduced by approximating a tone of each of pixels constituting the image by one of the maximum tone and the minimum tone and wherein an error between the actual tone of each pixel and the maximum or minimum tone by which the actual tone of the pixel is approximated is distributed to a plurality of adjacent pixels located adjacent to the pixel so as to correct the tone data of each of the adjacent pixels. The method eliminates an adverse effect on the reproduced image caused by accumulation of the negative errors, which may be produced when the actual tone of each pixel is approximated by the maximum tone higher than the actual tone and the error is distributed to the plurality of the adjacent pixels.

Another object of the invention is to provide an image processing apparatus using the above error diffusing method.

In order to achieve the above object, according to the present invention, an error diffusing method, which is used in an image reproducing process wherein an image is reproduced by approximating a tone of each of the pixels constituting the image by either the maximum tone or the minimum tone, comprises sequentially processing the pixels in a predetermined order to allocate to each pixel a first code indicative of a tone value of the maximum tone or a second code indicative of a tone value of the minimum tone which is determined depending on an actual tone of the one pixel; calculating an error as a difference between the actual tone of the one pixel and the tone value indicated by the code allocated to the one pixel and setting the error as a negative error when the first code is allocated to the one pixel and as a positive error when the second code is allocated to the one pixel; diffusing the calculated error to each of a plurality of following adjacent pixels, which are located in predetermined positional relationships with the one pixel and are to be processed after the one pixel has been processed, thereby correcting the tone value of each of the following adjacent pixels, such that when the calculated error is the positive error, the tone value of each of the following adjacent pixels is corrected by adding thereto a predetermined proportion of the positive error, and when the calculated error is the negative error, an absolute value of the predetermined proportion of the negative error is compared with an absolute value of the tone value of each of the following adjacent pixels and when the former is larger than the latter, the tone value of each following adjacent pixel is replaced by the predetermined proportion of the negative error and when the former is no larger than the latter, the tone value of each of the following adjacent pixels is maintained; and correcting the tone value of the one pixel prior to applying the first step to the one pixel, when there exists at least one preceding adjacent pixel which should be processed before the one pixel is processed and whose error should be diffused to the one pixel, by the error diffused from the one preceding adjacent pixel.

An image processing apparatus according to the invention comprises: means for sequentially processing pixels constituting an image in a predetermined order to allocate to each of the pixels either a first code indicative of a maximum tone or a second code indicative of a minimum tone which is determined depending on an actual tone of the one pixel; means for calculating an error as a difference between the actual tone of the one pixel and the tone value indicated by the code allocated to the one pixel and setting the error as a negative error when the first code is allocated to the one pixel and as a positive error when the second code is allocated to the one pixel. Furthermore, the apparatus includes means for diffusing the calculated error to a plurality of following adjacent pixels, which are located in predetermined positional relationships with the one pixel and are to be processed after the one pixel has been processed, thereby correcting the tone value of each of the following adjacent pixels. It is done so that when the calculated error is the positive error, the tone value of each of the following adjacent pixel is corrected by a predetermined proportion of the positive error, and when the calculated error is the negative error, an absolute value of the predetermined proportion of the negative error is compared with an absolute value of tone value of the each of the following adjacent pixels and when the former is larger than the latter, the tone value of each of the following adjacent pixels is replaced by the predetermined proportion of the negative error and when the former is no larger than the latter, the tone value of each of the following adjacent pixels is maintained. Also means is provided for correcting the tone value of the one pixel prior to allocating one of the first and second codes to the one pixel by the processing means, when there exists at least one preceding adjacent pixel which should be processed before the one pixel is processed and whose error should be diffused to the one pixel, by the error diffused from the preceding adjacent pixel by the diffusing means.

The error diffusing method in the image reproducing process of the invention includes the above steps. When the pixel to which the first code indicative of the maximum tone is allocated is printed, a dot is generated. When the pixel to which the second code indicative of the minimum tone is allocated is printed, no dot is generated. The positive error which occurs when no dot is generated is diffused to a plurality of the following adjacent pixels and cancelled by generating a dot at each of the following adjacent pixels. However, when the negative error, which is produced by generation of a dot, is diffused to a plurality of the following adjacent pixels, there is a possibility that another negative error is again produced in each of the following adjacent pixels to which the original negative error is diffused. Therefore, the negative error is further diffused to the further following adjacent pixels and the error is gradually accumulated. According to the error diffusing method of the invention, in case of the negative error, the absolute value of a predetermined proportion of the negative error is compared with the absolute value of the tone value of each of the following adjacent pixels. On the basis of the result of the comparison, the tone value of each of the following adjacent pixels is held unchanged or replaced by the predetermined proportion of the negative error, so that the negative errors are not infinitely accumulated.

DESCRIPTION OF THE PREFERRED EMBODIMENTS

Embodiments of the invention will be described with reference to the attached drawings.

Figure 1:
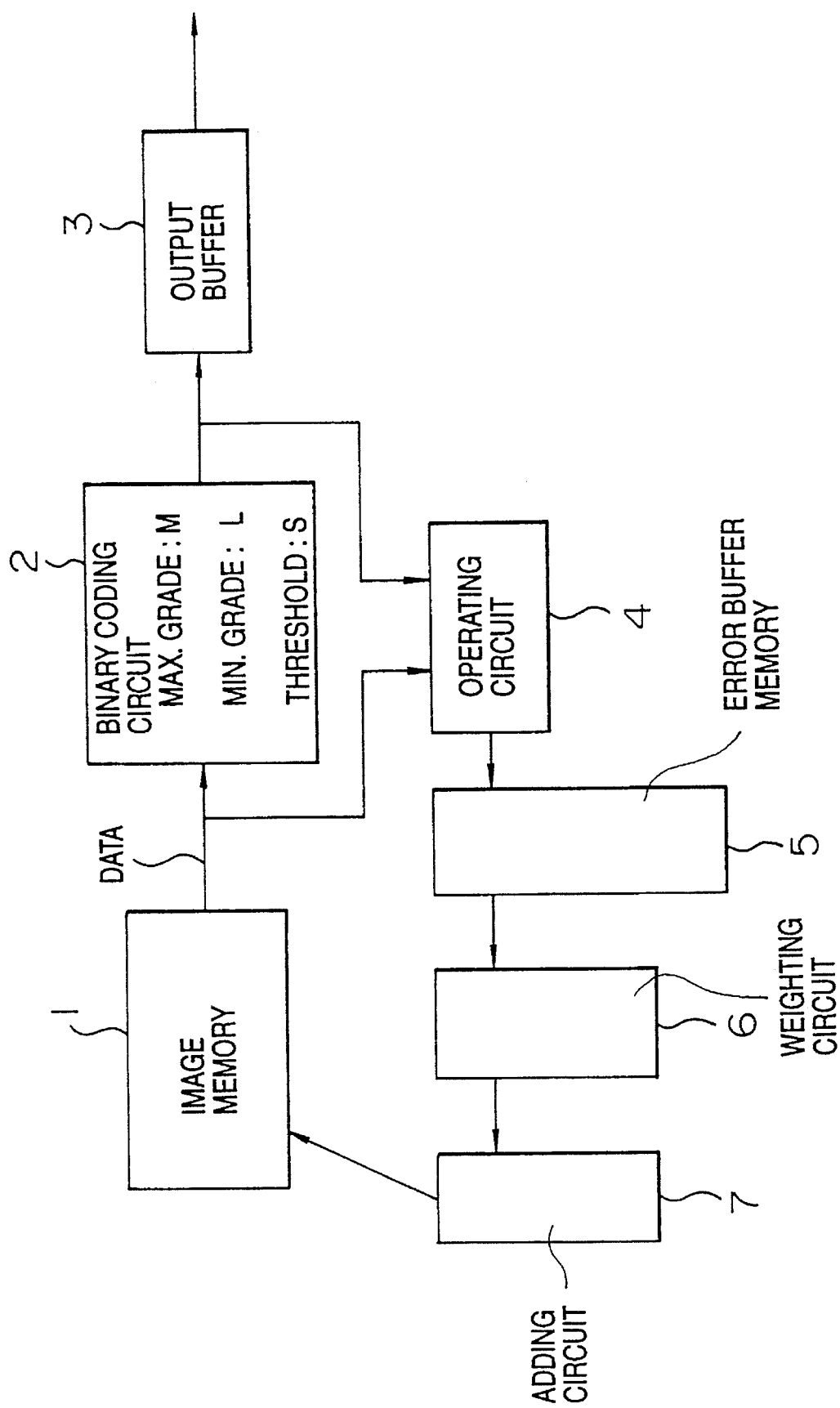
FIG. 1 is a diagram showing a circuit construction of a main section of an image processing apparatus of the first embodiment of the invention.
Figure 2:
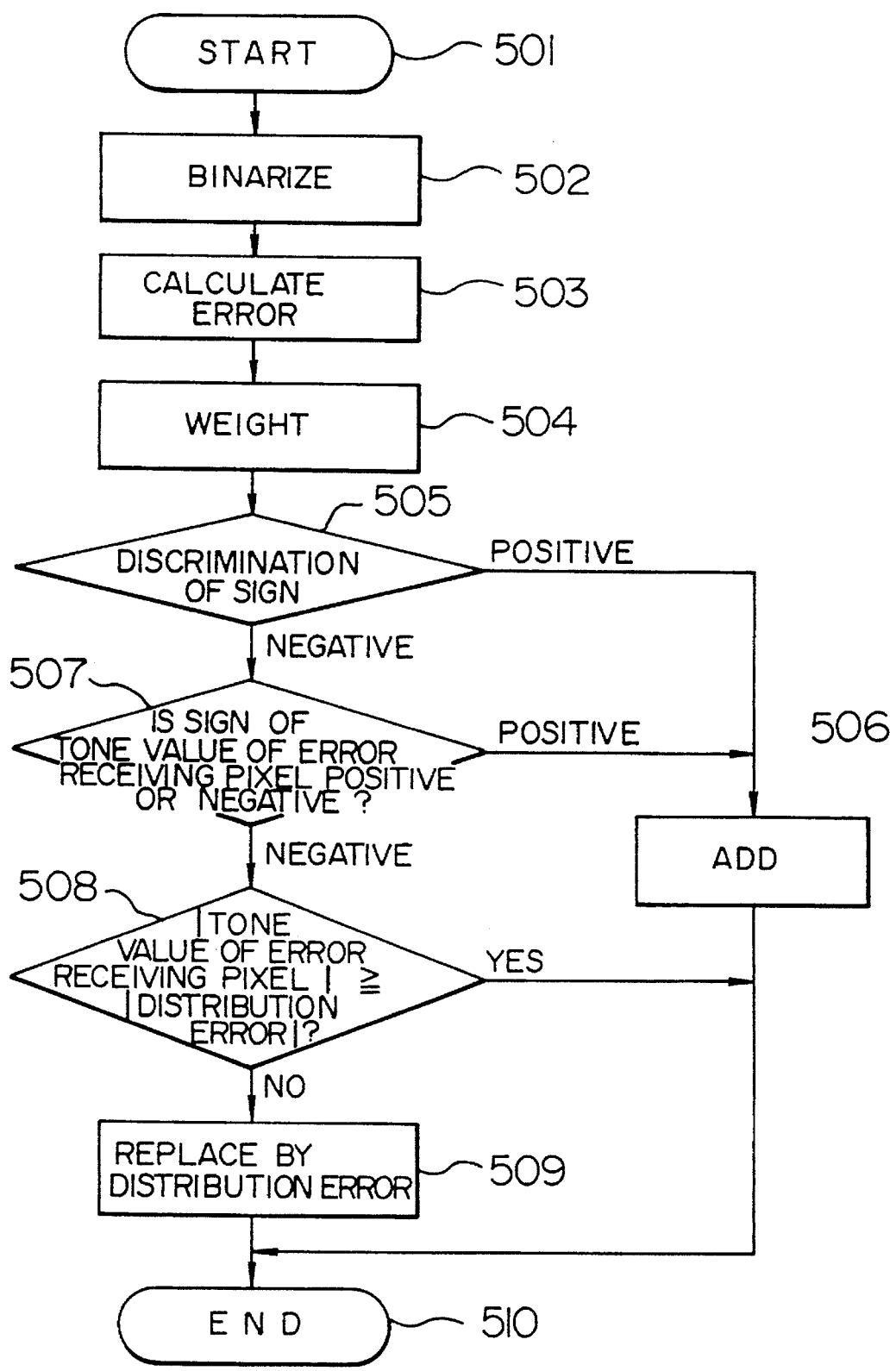
FIG. 2 is a flowchart showing an error diffusing process by the image processing apparatus in FIG. 1.

FIG. 1 is a circuit diagram of an image processing apparatus is illustrated showing an embodiment of the invention, whereas FIG. 2 is a flowchart for explaining the process carried out by the apparatus of FIG. 1.

In FIG. 1, reference numeral 1 denotes an image memory; 2 is a binary coding circuit; 3 is an output buffer; 4 is an operating circuit; 5 is an error buffer memory; 6 a weighting circuit; and 7 is an adding circuit.

The image memory 1 stores data and the binary coding circuit 2 determines whether a dot is to be generated or not for each pixel on the basis of the tone data DATA of the pixel which is supplied from the image memory 1. That is, in the binary coding circuit 2, the threshold value S is provided between the maximum tone M and the minimum tone L which can be reproduced by the image processing apparatus. The threshold value S is compared with the tone data DATA of each pixel as supplied. When the tone data DATA is no smaller than the threshold value S, a dot is generated. When DATA is smaller than S, no dot is generated.

The output buffer 3 temporarily stores an output of the binary coding circuit 2. The operating circuit 4 calculates an error produced as a result of the binary coding of the tone data. Further, the error buffer memory 5 temporarily stores the generated error. The weighting circuit 6 is provided to weight the tone data in accordance with the position of the pixel to which the error is distributed. The adding circuit 7 adds the weighted error to the data as will be explained hereinlater.

The operation of the embodiment will now be described on the basis of the above construction.

Figures 6, 7:
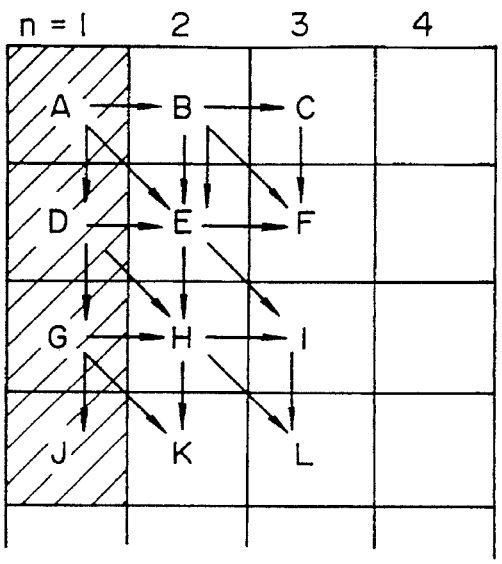
FIG. 6 is a diagram showing diffusing directions of an error of each pixel.
FIG. 7 is a diagram showing amounts of errors which are diffused when processed by the conventional error diffusing method.

The respective tone data of the pixels are sequentially read out from the image memory 1 and processed in an order of the pixels A→B→C→D→E→F→ in the pixel arrangement shown in FIG. 6. The tone data DATA of each pixel supplied from the image memory 1 is inputted to the binary coding circuit 2. In the binary coding circuit 2, the threshold value S (127) is set at a value between the maximum tone M (255) and the minimum tone L (0). The threshold value S is compared with the input data DATA and when the input data DATA is no smaller than the threshold value S, the binary coding circuit 2 generates a code "1". When the input data DATA is smaller than the threshold value S, a code "0 is generated. The above process is executed in step 502 in the flowchart of FIG. 2.

The binary code obtained by the binary coding circuit 2 as mentioned above is sent to the output buffer 3 in order to reproduce an image and is also sent to the operating circuit 4.

When the output of the binary coding circuit 2 is the code "1", a value which is obtained by subtracting 255 from the tone data DATA is generated as a negative error from the operating circuit 4. When the output of the binary coding circuit 2 is the code "0", a value of the tone data DATA is generated as a positive error (step 503). The above error is temporarily stored into the error buffer memory 5 and weighted by the weighting circuit 6 in accordance with the positional relationship of each of the pixels to which the error is distributed. For example, in this embodiment, the error is distributed to the pixels located at the right side, lower side and right-lower side of the processed pixel by 40%, 40% and 20%, respectively, of the error. Therefore, the error is weighted by 40% for the right-side pixel, 40% for the lower-side pixel and 20% for the right-lower side pixel (step 504).

The adding circuit 7 reads out the tone data stored in an address of the image memory 1 allotted to each of the error receiving pixels to which the error is to be distributed, corrects the read out data by adding to it the weighted error for that error receiving pixel and again storing the corrected tone data into the original address. Thus, the tone data of each pixel is replaced by a tone data corrected by an error distributed from each of the pixels which have been processed before the one pixel is processed. A method of adding the weighted error to the read-out data is executed in accordance with a predetermined rule as will be explained hereinafter.

The adding circuit 7 also judges the sign of the error (step 505). When a positive error occurs in the operating circuit 4, the data in the address of each of the pixels to which the error is to be diffused is simply read out and the error is added thereto for correcting the data. Then, the corrected data is again written into the same address (step 506).

In the case where a negative error occurs in the operating circuit 4, however, the data in the address of each of the error receiving pixels is read out and the sign of the read-out data is discriminated (step 507). The read-out data has a value obtained by adding the errors distributed from the adjacent pixels which had already been processed to the original tone value of the pixel itself.

When the discrimination in step 507 indicates that the sign of the read-out data is positive, the error multiplied by the weight coefficient is added to the read-out data and the resultant new data is again written into the same address (step 506).

On the other hand, when the sign of the read-out data is negative, an absolute value of the read-out data is compared with an absolute value of the weighted error to be distributed (step 508). When the absolute value of the read-out data is not smaller than the absolute value of the weighted error to be distributed, the processing routine is finished while maintaining the read-out data unchanged, that is without adding the error. When the absolute value of the weighted error to be distributed is larger than the absolute value of the read-out data, however, the read-out data is cancelled and the weighted error to be distributed is written into the address from which the data was read out (step 509). The read-out tone data of the pixel may be negative when the tone data of the pixel has been corrected by the negative error distributed from an adjacent pixel which has been processed before the read-out pixel.

By executing the above processes, when the corrected tone data of the error receiving pixel in the image memory 1 is negative, the tone data is replaced by the distributed error. When a large negative error newly occurs, therefore, the errors accumulated so far are cancelled and the preceding errors are not diffused any more. In other words, the expansion of a distribution range of the negative error is stopped where a large negative error occurs. Therefore, it is possible to eliminate the conventional drawback such that when two vertical lines are reproduced, the lower portion of the right line disappears because the negative error is infinitely diffused.

The second embodiment of the invention will now be described with reference to FIGS. 3 and 4.

Figure 3:
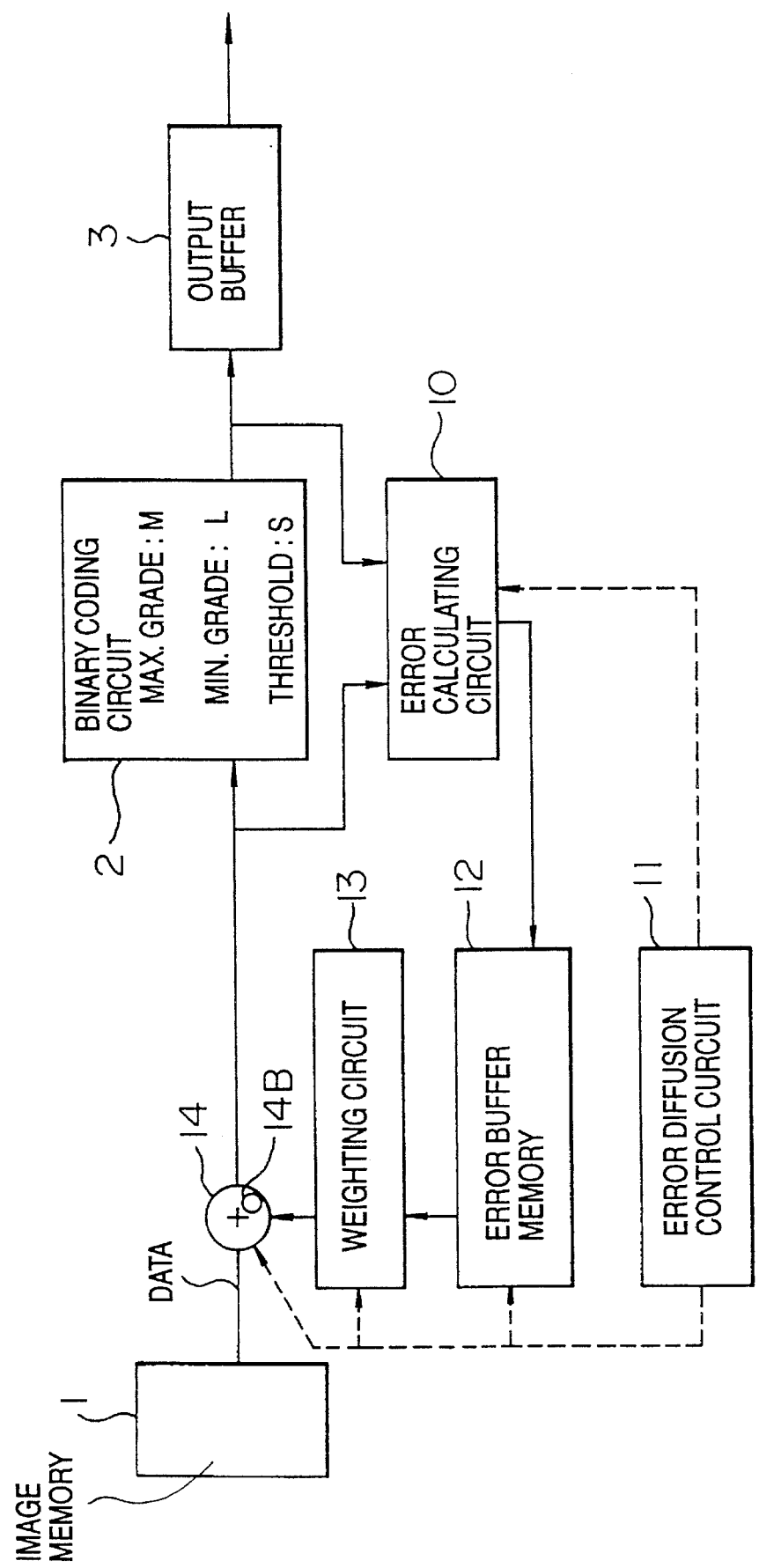
FIG. 3 is a diagram showing a circuit construction of a main section of an image processing apparatus of the second embodiment of the invention.
Figure 4:
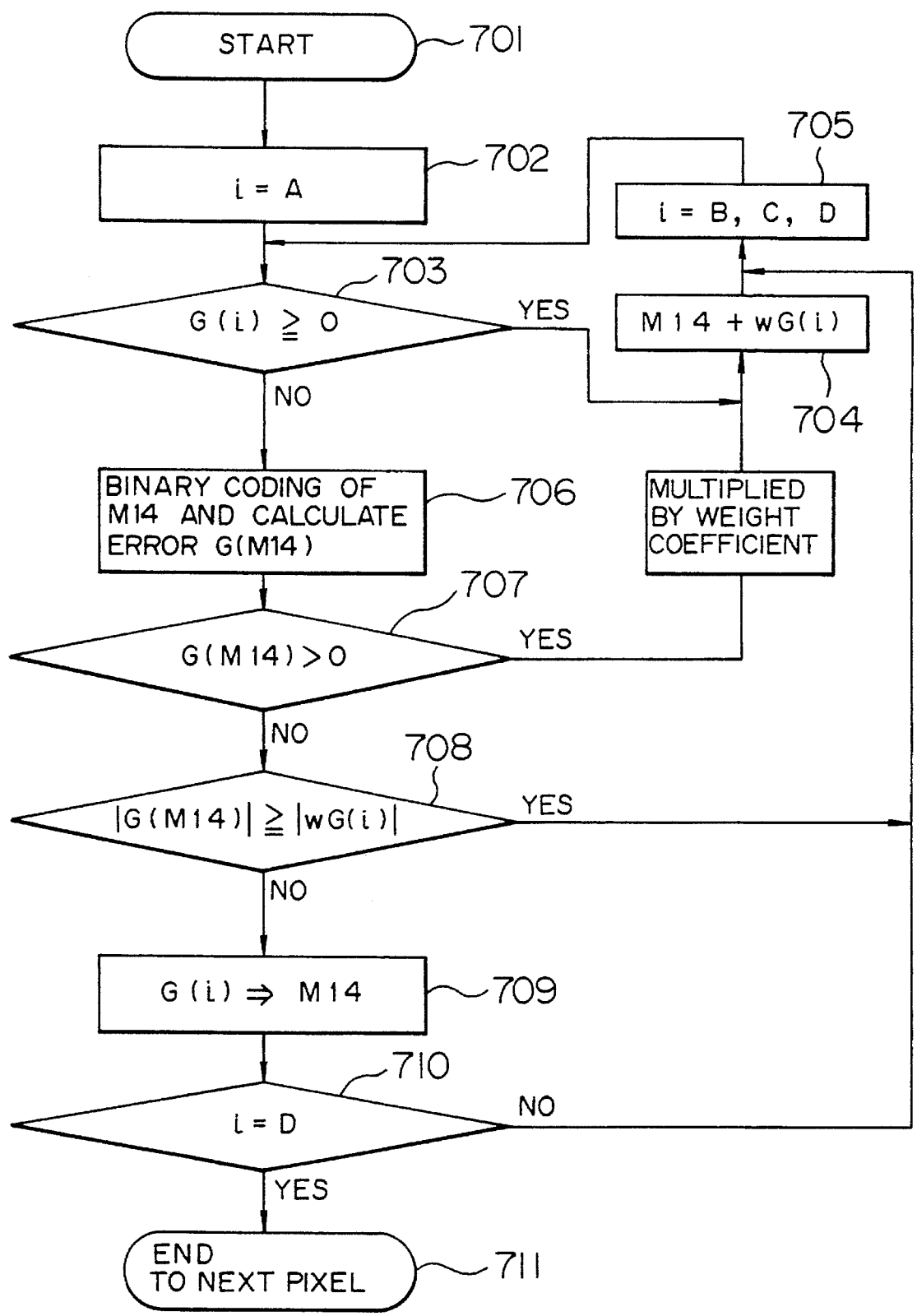
FIG. 4 is a flowchart showing an error diffusing process by the image processing apparatus in FIG. 3.
Figure 5A:
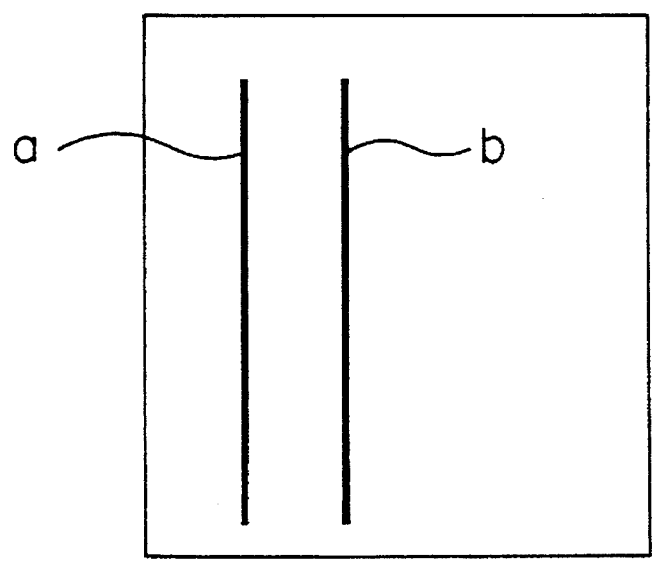
FIGS. 5A and 5B are diagrams respectively showing an actual image of two lines and an image of the lines as printed after processed by the conventional error diffusing method.
Figure 5B:
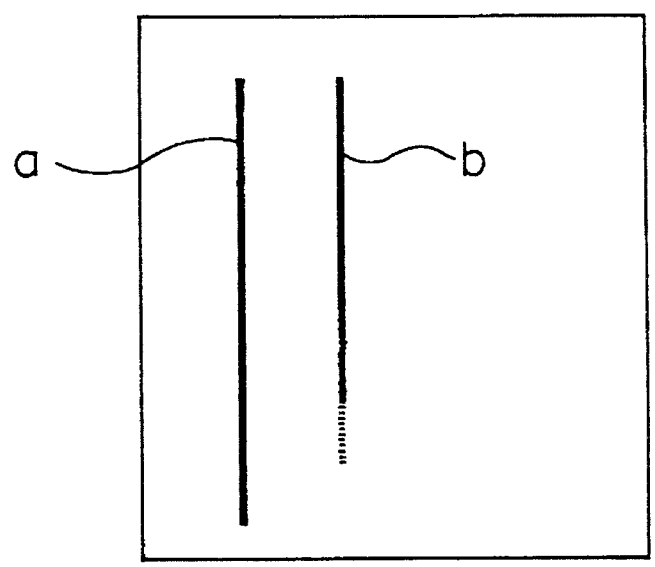

FIG. 3 is a constructional diagram of an image processing apparatus of the second embodiment of the invention, whereas FIG. 4 is a flowchart for explaining an error diffusing portion of the apparatus of FIG. 3.

The image processing apparatus comprises: the image memory 1 which stores the image data; the binary coding circuit 2 which converts the tone data DATA of each pixel which is supplied from the image memory 1 into one of two binary codes; the output buffer 3 which temporarily stores the output of the binary coding circuit 2; an error calculating circuit 10 which calculates the error between the tone data and the tone value represented by the converted binary code; an error diffusion control circuit 11 which determines whether the error is diffused or not; an error buffer memory 12; a weighting circuit 13; and an adding circuit 14. In the embodiment of FIG. 3 as well, with respect to the image having a pixel arrangement as shown in FIG. 6, the pixels are sequentially processed in an order of the pixels A→B→C→D→E→F→. Unlike in the first embodiment, however, the tone data of each pixel stored in the image memory 1 is not corrected during the execution of the process.

First, the tone data DATA of each pixel supplied from the image memory 1 is corrected by adding thereto the diffusion errors from adjacent pixels by the adding circuit 14. After that, the corrected tone data is sent to the binary coding circuit 2. In the binary coding circuit 2, the threshold value S (127) is set at a value between the maximum tone M (255) and the minimum tone L (0). The threshold value S is compared with the corrected tone data DATA. When the corrected tone data DATA is no smaller than the threshold value S, the binary coding circuit 2 generates a "1" signal. When the corrected tone data DATA is smaller than the threshold value S, a "0" signal is generated. The binary code generated from the binary coding circuit 2 is sent to the output buffer 3 and also to the error calculating circuit 10.

When the output of the binary coding circuit 2 is set to "1", the error calculating circuit 10 outputs a value obtained by subtracting 255 from the tone data DATA as a negative error. When the output of the binary coding circuit 2 is set to "0", the tone data DATA is outputted as a positive error.

The error G(X) of the pixel generally represented by X obtained as mentioned above is temporarily stored in the error buffer memory 12. When the pixel of the error receiving side is processed later, the error G(X) is weighted by the weighting circuit 13 with a coefficient determined depending on the position of the error receiving pixel relative to the pixel X. For instance, in the embodiment, a weight of 30% is allotted to the pixel located at the right side of the processed pixel. Similarly, a weight of 30% is allotted to the lower pixel, a weight of 20% to the right-lower pixel and a weight of 20% to the left-lower pixel. The error G(X) calculated by the error calculating circuit 10 is stored into the error buffer memory 12 and held at least until completion of the process of the error receiving pixels to which the error G(X) is distributed. The operation of each of the above circuits is controlled by the error diffusion control circuit 11. In the diagram, a solid line indicates a flow of data and a broken line indicates a flow of control signals.

An error diffusing method of the second embodiment will now be described with reference to FIG. 4.

In the case where the tone data DATA of, for example, the pixel E in FIG. 6 is read out from the image memory 1, the errors {G(A), G(B), G(C), G(D)} generated by the pixels A, B, C and D, for which the pixel E is designated as an error receiving side, are read out from the error buffer memory 12 under the control of the error diffusion control circuit 11. A weighting process is executed to the read-out errors by the weighting circuit 13. The weighted errors are added to or replaced for the tone data of the pixel E by the adding circuit 14 in accordance with a predetermined rule, which will be explained hereinlater. An output signal of the adding circuit 14 is sent to the binary coding circuit 2.

The adding circuit 14 discriminates the sign of each of the errors G(A), G(B), G(C) and G(D), generally represented by error G(i) and the processes are executed in an order of (1) to (4) as follows:

(1) The error diffusion control circuit 11 first fetches the tone data DATA of the pixel E in FIG. 6 as read out from the image memory 1 into a buffer memory 14B in the adding circuit 14.

(2) Subsequently, the sign of the error G(A) read out from the address of the pixel A in the error buffer memory 12 is discriminated (step 703).

(3) When the sign of the error G(A) is positive, the error read out from the address of the pixel A in the error buffer memory 12 is added, after being multiplied by a weight coefficient, to the data in the memory 14B in the adding circuit 14. The original data in the memory 14B is replaced by the added value. (step 704)

(4) When the sign of the error G(A) is negative, the data stored in the memory 14B (at this timing, it is the original tone data DATA of the pixel E in FIG. 6) is supplied to the binary coding circuit 2. The binary coding circuit 2 converts the tone data into one of two binary codes, applied to the error calculating circuit 10. The binary code is not stored into the output buffer 3. Upon completion of the process regarding the pixel D, the binary code as generated is stored into the output buffer 3. The error calculating circuit 10 calculates the error G (M14) of the tone data read out from the memory 14B, that is the difference between the tone data and a value represented by the binary code.

The error diffusion control circuit 11 discriminates the sign of the error G (M14) (step 707). When the sign of the error G (M14) is positive, the error G(A) of the pixel A in the error buffer memory 12 is multiplied by a weight coefficient by the weighting circuit 13 and, after that, the weighted error is added to the data stored in the memory 14B in the adding circuit 14 and the original data in the memory 14B is replaced by the added value.

When the sign of the error G (M14) is negative, the absolute value of the error G (M14) is compared with the absolute value of the error G(A) multiplied by the weight coefficient by the weighting circuit 13 (step 708).

When the absolute value of the error G (M14) is larger than the absolute value of the weighted error G(A), the error diffusing process is returned to the step 703 for processing the error of the next pixel B, without adding the weighted error G(A) from the weighting circuit 13 and hence, without changing the data in the memory 14B (step 705).

When the absolute value of the weighted error G(A) supplied from the weighting circuit 13 is larger than the absolute value of the error G (M14), the data in the memory 14B is replaced by the weighted error G(A) supplied from the weighting circuit 13.

The above steps are applied to the errors of the pixels A, B, C, and D, sequentially (i=A, B, C, D), which errors are distributed to the pixel E. Upon completion of the error diffusing process for the pixel D (step 711), the data in the memory 14B is outputted to the binary coding circuit 2. Subsequently, the binary output is supplied to the output buffer 3. The output of the error calculating circuit 10 is written into the address of the pixel E in the error buffer memory 12. The processing routine of the pixel E is completed as mentioned above.

As described above, in the first embodiment shown in FIG. 1, the error of each pixel is diffused to the adjacent pixels at a time when the binary coding of the tone data of that pixel has been completed. In the second embodiment, however, the error of each pixel is stored when the binary coding of the tone data of the pixel has been completed and each pixel receives the errors diffused from the adjacent pixels, when the tone data of that pixel is to be converted to one of the binary codes.

Even in the second embodiment, therefore, when a large negative error newly occurs, the errors which have been accumulated so far are cancelled and the preceding errors are not diffused any more. In other words, the expansion of a range in which the negative errors are diffused is stopped where a large negative error occurs. Even in the second embodiment, accordingly, it is possible to eliminate the drawback such that when two vertical lines are reproduced, the lower portion of the right line disappears because the negative error is infinitely diffused.

According to the invention as mentioned above, when the tone value is larger than the threshold value, the dot is generated, and when the difference between the tone value of the pixel and the maximum tone is diffused as negative error to the adjacent pixels, the relation in magnitude between the tone value of the pixel to which the error is to be distributed and the accumulation value of the errors, the sign (positive or negative) of the accumulation value of the errors are discriminated. When the accumulation value is positive, the accumulation value multiplied by a weight coefficient is added to the tone data of the error receiving pixel. On the other hand, when the accumulation value is negative, the absolute value of the accumulation value multiplied by the weight coefficient is compared with the absolute value of the tone data of the error receiving pixel. When the former is no larger than the latter, the tone value of the error receiving pixel is maintained, while the former is larger than the latter, the tone value of the error receiving pixel is replaced by the accumulated error multiplied by the weight coefficient. Therefore, it is possible to eliminate an adverse effect due to the negative errors being infinitely diffused. As a result, it is also possible to eliminate visually and practically undesired appearance of the reproduced image when the positive and negative errors are processed in the same manner and to reproduce the image with visually good tone at its area around the pixels of interest.

I claim:

1. An error diffusing method in an image reproducing process wherein an image is reproduced by approximating a tone of each of a plurality of pixels constituting the image by either a maximum tone or a minimum tone, said method comprising:

1) sequentially processing the pixels in a predetermined order to allocate to each of the pixels one of a first code indicative of a tone value of the maximum tone and a second code indicative of a tone value of the minimum tone which is determined depending on an actual tone of the one pixel;

2) calculating an error as a difference between the actual tone of the one pixel and the tone value indicated by the code allocated to the one pixel and setting the error as a negative error when the first code is allocated to the one pixel and as a positive error when the second code is allocated to the one pixel;

3) diffusing the calculated error to each of a plurality of the following adjacent pixels, which are located in predetermined positional relationships with the one pixel and are to be processed after the one pixel has been processed, thereby correcting the tone value of each of the following adjacent pixels, so that when the calculated error is the positive error, the tone value of each of the following adjacent pixels is corrected by adding thereto a predetermined proportion of the positive error, and when the calculated error is the negative error, an absolute value of the predetermined proportion of the negative error is compared with an absolute value of the tone value of each of the following adjacent pixels and when the former is larger than the latter, the tone value of each of the following adjacent pixels is replaced by the predetermined proportion of the negative error and when the former is no larger than the latter, the tone value of each of the following adjacent pixels is maintained; and 4) correcting the tone value of the one pixel prior to applying the processing step to the one pixel, when there exists at least one preceding adjacent pixel which should be processed before the one pixel is processed and whose error should be diffused to the one pixel, by the error diffused from the one preceding adjacent pixel.

2. A method according to claim 1, wherein said plurality of pixels are arranged along a plurality of lines, which are arranged sequentially from an uppermost one to a lowermost one and each of which extends from left to right, and wherein said pixels are processed in an order from the pixels of the uppermost line to the pixels of the lowermost line and from a leftmost pixel to a rightmost pixel in each line and the error of the one pixel is diffused to the pixels located at a right side, a lower side and a right-lower side of said one pixel by proportions of 40%, 40% and 20%, respectively.

3. A method according to claim 1, wherein said plurality of pixels are arranged along a plurality of lines, which are arranged sequentially from an uppermost one to a lowermost one and each of which extends from left to right, and wherein said pixels are processed in an order from the pixels of the uppermost line to the pixels of the lowermost line and from a leftmost pixel to a rightmost pixel in each line and the error of each of the pixels is diffused to the pixels located at a right side, a lower side, a right-lower side and a left-lower side of said one pixel by proportions of 30%, 30%, 20% and 20%, respectively.

4. A method according to claim 1, wherein said processing step includes storing the tone values of said plurality of pixels in a plurality of memory areas of a memory allotted to said pixels, respectively, and reading out the tone values of the respective pixels from the memory areas sequentially in the same order as that in which the pixels are processed in the processing step and allotting to a pixel corresponding to each of the read-out tone values one of the first and second codes depending on a magnitude of the read-out tone value; and wherein said correcting step includes replacing the tone value stored in the memory area allotted to each of said following adjacent pixels by the corrected tone value of the following adjacent pixel corrected by the error diffusion.

5. A method according to claim 1, wherein said processing step includes storing of the tone values of said plurality of pixels in a plurality of memory areas of a first memory allotted to said pixels, respectively, and reading out the tone values of the respective pixels from the memory areas sequentially in the same order as that in which the pixels are processed in the processing step, storing the tone value of each of the read-out pixels into a second memory and allotting to each of the read-out pixels one of the first and second codes depending on a magnitude of the tone value of that pixel;

said diffusing step includes temporarily storing the calculated error of each of the read-out pixels in one of the memory areas of a third memory allotted to that pixel and correcting, when the tone value of one of the following adjacent pixels, to which the corrected error of the read-out pixel is to be diffused, is read out from the first memory and stored in the second memory, the tone value of said one of the following adjacent pixels based on said calculated error and replacing the tone value of said one of the following adjacent pixels by the corrected tone value thereof; and wherein the allotting of one of the first and second codes to said one of the following adjacent pixels by said reading out step is carried out based on the corrected tone value thereof.

6. An image processing apparatus comprising:

1) means for processing a plurality of pixels constituting an image in a predetermined order to allocate to each of the plurality of pixels one of a first code indicative of a tone value of a maximum tone and a second code indicative of a tone value of a minimum tone which is determined depending on a tone value of the one pixel;

2) means for calculating an error as a difference between the tone value of the one pixel and the tone value indicated by the code allocated to the one pixel and setting the error as a negative error when the first code is allocated to the one pixel and as a positive error when the second code is allocated to the one pixel;

3) means for diffusing the calculated error to each of a plurality of the following adjacent pixels, which are located in predetermined positional relationships with the one pixel and are to be processed after the one pixel has been processed, thereby correcting the tone value of each of the following adjacent pixels, such that when the calculated error is the positive error, the tone value of each of the following adjacent pixels is corrected by adding thereto a predetermined proportion of the positive error, and when the calculated error is the negative error, an absolute value of the predetermined proportion of the negative error is compared with an absolute value of the tone value of each of the following adjacent pixels and when the former is larger than the latter, the tone value of each of the following adjacent pixels is replaced by the predetermined proportion of the negative error and when the former is no larger than the latter, the tone value of each of the following adjacent pixels is maintained; and 4) means for correcting the tone value of the one pixel prior to processing the one pixel by the processing means, when there exists at least one preceding adjacent pixel which is processed before the one pixel is processed and whose error is to be diffused to the one pixel, by the error diffused from the one preceding adjacent pixel by the diffusing means.

7. An apparatus according to claim 6, wherein said plurality of pixels are arranged along a plurality of lines, which are arranged sequentially from an uppermost one to a lowermost one and each of which extends from left to rights, and wherein said plurality of pixels are processed by said processing means in an order from the pixels of the uppermost line to the pixels of the lowermost line and from a leftmost pixel to a rightmost pixel in each line and the error of the one pixel is diffused by said diffusing means to the pixels located at a right side, a lower side and a right-lower side of said one pixel by proportions of 40%, 40% and 20%, respectively.

8. An apparatus according to claim 6, wherein said plurality of pixels are arranged along a plurality of lines, which are arranged sequentially from an uppermost one to a lowermost one and each of which extends from left to right, and wherein said plurality of pixels are processed by said processing means in an order from the pixels of the uppermost line to the pixels of the lowermost line and from a leftmost pixel to a rightmost pixel in each line and the error of the one pixel is diffused by said diffusing means to the pixels located at a right side, a lower side, a right-lower side and a left-lower side of said one pixel by proportions of 30%, 30%, 20% and 20%, respectively.

9. An apparatus according to claim 6, wherein said processing means includes a memory having a plurality of memory areas allotted to said plurality of pixels for storing the tone values of said plurality of pixels, respectively; and means for reading out the tone values of the respective pixels from the memory areas sequentially in the same order as that in which said plurality of pixels are processed by said processing means and allotting to a pixel corresponding to each of the read-out tone values one of the first and second codes depending on a magnitude of the read-out tone value; and said correcting means includes means for replacing the tone value stored in the memory are allotted to each of said following adjacent pixels by the corrected tone value of the following adjacent pixel corrected by said diffusing means.

10. An apparatus according to claim 6, wherein said processing means includes a first memory having a plurality of memory areas allotted to said plurality of pixels for storing the tone values of said plurality of pixels, respectively; a second memory; means for reading out the tone values of the respective pixels from the memory areas sequentially in the same order as that in which said plurality of pixels are processed in said processing means and storing the tone value of each of the read-out pixels in said second memory and means for allotting to each of the read-out pixels one of the first and second codes depending on a magnitude of the tone value of that pixel;

said diffusing means includes a third memory for temporarily storing the calculated error of each of the read-out pixels and means for correcting, when the tone value of one of the following adjacent pixels, to which the corrected error of the read-out pixel is to be diffused, is read out from the first memory and stored in the second memory, the tone value of said one of the following adjacent pixels based on said calculated error and replacing the tone value of the one of the following adjacent pixels by the corrected tone value thereof; and wherein the allotting of tone of the first and second codes to said one of the following adjacent pixel by said allotting means is carried out based on the corrected tone value thereof.

\* \* \* \* \*